(12) United States Patent
Houlihan et al.

(10) Patent No.: US 6,204,304 B1
(45) Date of Patent: *Mar. 20, 2001

(54) VINYL ETHER-BASED OPTICAL FIBER COATINGS

(75) Inventors: Francis Michael Houlihan, Millington; Mark Anthony Paczkowski, Green Township, Sussex County; Debra Ann Simoff, South Plainfield, all of NJ (US); Ulrike Varlemann, Horsham, PA (US); Nanze Patrick Wang, Chatham, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/161,886

(22) Filed: Sep. 28, 1998

(51) Int. Cl.$^7$ .............................. G02B 5/18; G02B 27/44; G02B 6/16; C08F 2/50
(52) U.S. Cl. ..................... 522/88; 522/107; 522/120; 522/121; 522/141; 522/142; 522/148; 522/99; 522/170; 522/172; 522/181; 428/378; 430/321; 430/945; 359/566; 359/569; 385/37; 385/123; 385/142; 385/143; 385/145
(58) Field of Search .......................... 428/378; 385/145, 385/37, 123, 143, 142; 522/88, 96, 97, 99, 103, 107, 172, 181, 170, 120, 121, 141, 142, 148; 427/163.2, 510, 513; 359/566, 569; 430/321, 945

(56) References Cited

U.S. PATENT DOCUMENTS

| | | | |
|---|---|---|---|
| 4,956,198 | * 9/1990 | Shama et al. | 427/520 |
| 5,139,872 | * 8/1992 | Lapin et al. | 428/375 |
| 5,252,682 | * 10/1993 | Bayha | 525/445 |
| 5,352,712 | * 10/1994 | Shustack | 522/31 |
| 5,620,495 | * 4/1997 | Aspell et al. | 65/392 |
| 5,837,750 | * 11/1998 | Szum et al. | 522/81 |
| 5,847,021 | * 12/1998 | Tortorello et al. | 522/90 |
| 5,907,023 | * 5/1999 | Chawla | 528/49 |
| 5,989,627 | * 11/1999 | Blyler, Jr. et al. | 427/163.2 |

* cited by examiner

Primary Examiner—Susan W. Berman (57) ABSTRACT

The specification describes optical fiber coating materials and methods for making optical fiber gratings wherein the material of the optical fiber coatings comprises vinyl ether functionalized monomers, together with oligomeric or polymeric thickeners and a cationic photoinitiator. These coating materials are highly transparent to UV radiation used to write optical gratings in the optical fibers but still absorb sufficiently at other wavelengths to be cured effectively using UV radiation.

29 Claims, 5 Drawing Sheets

VINYL ETHER-BASED OPTICAL FIBER COATINGS

FIELD OF THE INVENTION

This invention deals with vinyl ether-based optical fiber coating formulations that have enhanced ultraviolet (UV) transparency and are UV light curable. The invention also deals with the use of such coatings in the fabrication of optical fiber gratings, wherein the UV transparency of the coating allows the core of the glass fiber to be exposed to a pattern of radiation through the coating using a UV laser.

BACKGROUND OF THE INVENTION

Holographic gratings formed in the core of optical fibers are finding increasing use in a variety of optical device applications. See A. E. White and S. J. Grubb "Optical Fiber Components and Devices," Ch. 7 in *Optical Fiber Telecommunications*, Vol. IIIB, T. L. Koch and I. P. Kaminow, ed., Academic Press, pp. 267–318 (New York, 1997). These include fiber lasers, semiconductor laser stabilizers, pump reflectors, dispersion compensators, filters, demultiplexers, and gain equalizers. Such gratings may also be used as strain sensors in architectural applications. The increasing market demand for optical fiber gratings has stimulated the development of manufacturing methods for their mass production.

An optical fiber comprises an inner core of relatively high refractive index, an outer cladding, and a polymer coating. The inner core is made of ultraviolet (UV) photosensitive glass, such as a germanosilicate, so that a grating can be induced by UV irradiation. The dominant method for photo-inducing gratings in optical fibers is by side writing into a stripped fiber with UV light through the fiber cladding. The fiber is exposed to actinic light having an intensity that varies periodically along the length of the fiber. This, in turn, creates periodic refractive index variations in the fiber core. The periodically varying intensity pattern is typically provided by applying a UV beam through an optical phase mask. See Anderson et al, U.S. Pat. No. 5,327,515 issued Jul. 5, 1994. Alternately, the intensity pattern can be provided by an amplitude mask or by interfering a pair of coherent UV beams. See W. H. Glenn et al, U.S. Pat. No. 4,725,110, issued Feb. 16, 1998. In each of these techniques, the source of actinic radiation is typically a high intensity excimer laser operating with an output wavelength near 240 nm. Longer wavelength sources may be used, depending upon the level of photosensitivity of the particular fiber and the degree of index change that is needed.

Frequently, the photosensitivity of the fiber is enhanced for writing by treating it with hydrogen or deuterium under elevated temperature and pressure. The hydrogen or deuterium diffuses through the polymer coating and cladding, and into the core of the optical fiber. Such treatment enhances the photosensitivity of the core so that the grating can be written at a lower intensity or lower dose. The photosensitivity of the core can be further enhanced in a number of known ways, including for example collapsing the preform under a reducing atmosphere in order to increase the concentration of photosensitive sites (U.S. Pat. No. 5,157,747 to R. M. Atkins, K. T. Nelson, K. L. Walker, "Photorefractive Optical Fiber", issued Oct. 20, 1992).

Presently, a time-consuming step in grating fabrication is removing and subsequently reapplying the protective polymer coating that was applied to the fiber at the time of drawing. The coating is needed to protect the sensitive fiber from contamination and mechanical damage, but typical coatings are highly UV absorbent and inhibit grating formation. This is, in part, because most commercial fiber coatings are UV curable and incorporate highly absorbing photoinitiators in order to initiate the curing process. Such coatings are damaged by UV laser beams. Upon exposure to UV, the coatings block the light via absorption, converting the energy to heat. They discolor and will eventually ablate, given sufficient exposure. Thus, an initial step in conventional grating writing is stripping the polymer coating, as by soaking the fiber in hot sulfuric acid. The coating removal and reapplication steps may consume more than half the time required to fabricate a grating.

In an alternate fabrication technology, gratings have been written into the fiber during drawing before application of the coating. See L. Dong, J.-L. Archambault, L. Reekie, P. St. J. Russell, D. N. Payne "Single Pulse Bragg Gratings Written During Fibre Drawing," *Electron.Lett.*, 29(17), 1577 (1993). A limitation of these gratings is that they typically have low reflectivities due to the single pulse exposure. An earlier patent, U.S. Pat. No. 5,620,495, incorporated herein by reference, demonstrated that, with the proper selection of low absorbing polymer, gratings could be formed by exposing the core through the polymer coating and cladding to a pattern of UV radiation. Following this teaching, the coating must be substantially transparent to the UV radiation used to form the grating. Typical polymer coating materials used in commercial practice have minimal UV transparency, particularly near 240 nm, owing largely to the presence of UV absorbing photoinitiators. The patent referenced above teaches various polymer coating materials that can be formulated to be sufficiently UV transparent to allow the formation of gratings using radiation directed through the coating, e.g., alkyl-substituted silicones and silsesquioxanes, aliphatic polyacrylates, polymethacrylates and vinyl ethers. The cited examples utilized a thermally cured methylsilsesquioxane coating which, as such, did not contain UV absorbing photoinitiators and provided good UV transparency. Claesson et al subsequently demonstrated a fiber grating written through a thin solvent-deposited coating of Teflon AF, a fluoropolymer that likewise did not contain UV photoinitiators. See A. Claesson, B. Sahlgren, M. Fokine, R. Stubbe, "UV-transparent Coatings for Optical Fiber," Proc. of 46$^{th}$ Int. Wire & Cable Sym., pp.82–85 (1997).

Thus, both thermal curing and solvent deposition processes have been used to provide UV transparent coatings by avoiding the use of UV absorbing photoinitiators. However, a UV curable coating is preferred in order to be compatible with conventional fiber draw processes. The benefits of UV curable coatings include a more rapid rate of hardening, the capability of applying relatively thick coatings with minimal shear stress on the fiber, superior control of viscosity during the coating process, avoidance of solvent usage, and the elimination of high-temperature curing or evaporating furnaces. However, optical fiber coatings that are UV curable while also maintaining good UV transparency in the mid-UV range near 240 nm are difficult to produce using conventional technologies.

In a more recent patent, U.S. Pat. No. 5,773,486, UV curable coatings are disclosed that have substantial UV transparency in the range of 240–260 nm. This is achieved using novel low UV absorbing free radical photoinitiators. However, the disclosed coating resins are based on the use of free radical chemistry and the cited examples use acrylate monomers, wherein the attainable UV transparency is limited due to the presence of C=O functional groups which are weak, but significant, UV absorbers.

Conventional optical fiber coatings often have significant transparency in the near-UV range, i.e., at wavelengths greater than ~300 nm, and some researchers have attempted to exploit that window for writing through the coating. For example, Starodubov et al reported a ~1 dB grating written through a conventional fiber coating using 334 nm light and later, a ~15 dB grating written through a 40 µm silicone coating at 302 nm. (See D. S. Starodubov, V. Grubsky, J. Feinberg "Efficient Bragg Grating Fabrication in a Fibre Through Its Polymer Jacket Using Near-UV Light," *Electron. Lett.*, 33, pp. 1331–1332 (1997) and D. S. Starodubov, V. Grubsky, J. Feinberg, E. M. Dianov, S. L. Semjonov, A. N. Guryanov, N. N. Vechkanov "Fiber Bragg Gratings with Reflectivity>97% Fabricated Through Polymer Jacket Using Near-UV Light," Bragg Gratings, Photosensitivity, and Poling in Glass Fiber and Waveguides: Applications and Fundamentals Topical Meeting, Optical Society of America, Williamsburg, Va., post-deadline paper PD1-1, Oct. 26–28, 1997. Because the optical absorption in the fiber core at 334 nm and 302 nm is much weaker than at 244 nm, ( See R. M. Atkins "Measurement of the Ultraviolet Absorption Spectrum of Optical Fibers," *Opt. Lett.*, 17 pp. 469–471 (1992)), gratings written at longer wavelengths require unusually high UV intensities, as much as 1 kW/cm$^2$, very high germanium concentration (~20 mol %) and in some cases the addition of boron as a co-dopant to increase the photosensitivity of the fiber. Such high levels of germanium make it difficult to achieve low-loss splices to standard communication grade fibers, and are not highly desirable.

A number of previous practitioners have cited the utility of vinyl ethers for formulating optical fiber coatings. See e.g. S. A. Shama, E. S. Poklacki, J. M. Zimmerman "Ultraviolet-curable cationic vinyl ether polyurethane coating compositions" U.S. Pat. No. 4,956,198 (1990); S. C. Lapin, A. C. Levy "Vinyl ether based optical fiber coatings" U.S. Pat. No. 5,139,872 (1992); P. J. Shustack "Ultraviolet radiation-curable coatings for optical fibers" U.S. Pat. No. 5,352,712 (1994); J. R. Petisce "Optical fiber including acidic coating system," U.S. Pat. No. 5,181,269 (1993). However, prior art vinyl ether-based optical fiber coatings have not been formulated expressly to achieve high UV transparency, especially at wavelengths as low as 240 nm. Neither, apparently, have vinyl ethers been used to formulate coatings for other applications requiring high UV transparency at wavelengths as low as 240 nm.

Various oligomers or polymers that were not vinyl ether functionalized have been used in coating formulations with vinyl ether monomers. Such oligomers/polymers have included non-reactive resin fillers such as cellulose derivatives (See S. C. Lapin "Semi-interpenetrating polymer networks" U.S. Pat. No. 4,654,379), as well as reactive acrylate-functional oligomers, unsaturated polyester oligomers (See C. E. Bayha "Cationically initiated curable resin system" U.S. Pat. No. 5,252,682), or epoxy-functional oligomers (See J. A. Dougherty, F. J. Vara, and L. R. Anderson "Vinyl Ethers for Cationic UV Curing," *Radcure'86 Conf. Proc.*, 15-1, Soc. Manuf. Eng., Dearborn, Mich. (1986), and J. A. Dougherty, F. J. Vara, and L. R. Anderson "Vinyl Ethers for Cationic UV Curing," *Radcure'86 Conf. Proc.*, 15-1, Soc. Manuf. Eng., Dearborn, Mich. (1986). While certain of these components might conceptually provide good UV transparency, apparently no attempt has been made to incorporate them in vinyl ether coatings so as to optimize UV transparency, especially in the wavelength region of 240–300 nm. For example, U.S. Pat. No. 4,654,379 only cites examples which use a high level (4 phr) of an aromatic onium salt catalyst, which would have poor UV transparency. The epoxy-functional oligomers that are commercially available (e.g., the diglycidyl ether of Bisphenol A or its derivatives) often contain aromatic groups that are unacceptable for UV transparency and also increase the tendency toward yellowing. In general, the commercially available cycloaliphatic (non-aromatic) epoxies do not have sufficiently high molecular weights of themselves to provide adequate viscosity for optical fiber coating applications.

SUMMARY OF THE INVENTION

Optical fiber coatings with superior UV transparency, and that are also UV curable, are formulated using low UV absorbing vinyl ether-based monomer(s), together with selected low UV absorbing oligomers or polymers to elevate viscosity, and low levels of cationic photoinitiators. Such coatings may be used on optical fibers to fabricate gratings by directing a pattern of UV radiation through the fiber coating and cladding into the core, eliminating the need to remove and reapply the coating.

DETAILED DESCRIPTION OF THE INVENTION

An important aspect of this invention is the use of selected types of vinyl ether monomers to formulate UV curable coatings having superior UV transparency. Vinyl ethers represent a relatively new chemistry for preparing photopolymerizable coatings. See J. V. Crivello, J. L. Lee, and D. A. Conlon *Radcure VI Conf. Proc.*, p. 4–28, Soc. Manuf. Eng., Dearborn, Mich. (1982). From the standpoint of UV transparency, the vinyl ether chemical structure $[CH_2=CH-O-]_nR$ is superior to that of an acrylate $[CH_2=CH(C=O)-O-]_nR$ since it doesn't contain carbonyl groups, which have weak but significant UV absorptions at wavelengths in the region of 240–300 nm. Here R may optionally comprise various types of chemical substituents, e.g., alkyl, cycloalkyl, aryl, alkylaryl, and/or moieties containing heteroatoms such as ester, urethane, ether, ketone, etc. R may also comprise siloxanes or fluorocarbons, and n is greater than or equal to 1. For purposes of maximizing UV transparency, R should be selected so as to be substantially devoid of UV absorbers such as aromatic species and carbonyl groups. Favorable types of chemical bonds that may be included in R and which do not absorb significantly at wavelengths greater than 240 nm, are C—C, C—H, C—O, C—Si, O—H, Si—O, C—F, and C—Cl.

Vinyl ethers may, in principle, be polymerized by ultraviolet (UV) radiation using either cationic or free radical photoinitiators. However, when cured free radically, vinyl ethers do not homopolymerize well, and must typically be copolymerized with other components such as acrylates (See J. R. Snyder, G. D. Green, J. J. Krajewski, "Free-radical co-polymerization of acrylates and vinyl ethers," U.S. Pat. No. 5,352,713), or unsaturated esters (See J. Gaske, J. J. Krajewski, G. K. Noren "Method of coating concrete floors with photocurable coatings," U.S. Pat. No. 4,999,216; G. K. Noren, J. J. Krajewski, S. A. Shama, J. M. Zimmerman, D. C. Thompson, J. T. Vandeberg "Free-radical curable compositions" U.S. Pat. No. 5,334,456). For optimal cure, the mole fraction of vinyl ether groups in these mixtures is typically less than 0.5. Because acrylate and ester co-reactants contain C=O groups, they limit the attainable level of UV transparency in free radically cured vinyl ether-containing formulations.

When vinyl ethers are cured cationically, they do homopolymerize well and are capable of curing extremely rapidly. This rapid cure speed is related to the electron rich nature of the vinyl ether's C=C double bond. Furthermore, the cationic curing of vinyl ethers is not subject to oxygen inhibition as is the free radical cure of acrylates, where cure speed decreases in the absence of inert gas blanketing.

The vinyl ether cure speed depends upon the concentration of cationic photoinitiator that is present. Cure speeds thereof typically increase with the amount of photoinitiator being used. Cationic photoinitiators that are typically used for curing vinyl ethers are highly UV absorbent aromatic-containing materials such as triarylsulfonium and diaryliodonium salts. We have discovered that, because of the rapid cure response of vinyl ethers, cationic photoinitiators can be used at extremely low levels in order to provide coating formulations that are both UV curable and highly UV transparent. For example, photoinitiator concentrations in UV curable acrylate formulations are typically in the range of 1–10 wt %, while we obtain satisfactory cure speeds in vinyl ether formulations using cationic photoinitiator concentrations of only $\leq 0.1$ wt %, and even <0.01 wt %. The level of UV transparency and cure speed also rely on judicious selection of monomer and oligomer or polymer components, so that the absorbance of these components does not compete with that of the photoinitiator. Importantly, the coating components should be selected to minimize the content of basic species, since these interfere with the cationic curing mechanism. In particular, nitrogen-containing groups such as amines, amides and urethanes should be kept to low concentrations and, preferably, avoided altogether where possible.

Most UV curable coatings contain one or more reactive monomer(s), together with at least one oligomer or polymer component, and photoinitiator(s). The combination of monomers and oligomers/polymers can be tailored in various ways to provide a balance of desired properties for a given coating, e.g., viscosity, hardness, glass transition temperature, strippability, chemical resistance, etc., as well as UV transparency.

Optical Fiber Coating Properties

Certain optical fiber applications require a single, abrasion resistant coating while other applications utilize a dual-coat structure wherein the outer coating is hard and abrasion resistant and the inner coating is made soft in order to cushion the fiber against microbending, especially at low temperatures. Presently, single-coat abrasion resistant coatings are of most interest for fiber grating applications. However, dual-coat structures may be desirable under some circumstances. The need for hardness and abrasion resistance in single-coat applications usually requires that the midpoint of the glass transition temperature ($T_g$) of the coating after cure be higher than room temperature. Soft coatings, conversely, require $T_g$ midpoints below room temperature, typically lower than $-40°$ C.

For conventional optical fiber draw processes the uncured coating should have a viscosity of about 2000–15,000 cps at 25° C. as measured using a Brookfield viscometer, and preferably 5000–10,000 cps.

Vinyl Ether Monomers

For preparation of UV transparent optical fiber coatings, vinyl ether monomers should be selected first on the basis of having low UV absorption. They should also have relatively high boiling points (to minimize volatility during UV curing), and be selected on the basis of whether a hard or soft coating (high or low $T_g$) is required. At least one component of the formulation should have a functionality greater than one in order to achieve a crosslinked network. That is, in most cases there should be at least one difunctional or multifunctional vinyl ether monomer in the formulation. Alternatively, if only monofunctional vinyl ether monomer is used, then the thickener component should have an average of two or more functional groups per molecule that can react to form covalent bonds with the vinyl ether groups. For most applications the optical fiber coating is not expected to act as a cladding, and so should have a post-cure refractive index that is greater than that of the glass cladding. The higher refractive index is to allow any errant light during signal transmission to be refracted out of the coating rather than into the core. We have determined that most hydrocarbon-based vinyl ether monomers satisfy the requirement of providing a refractive index greater than that of silica after cure.

For certain optical fiber grating applications, the polymer coating may be required to act as a second optical cladding and should thus have a refractive index less than that of the inner (silica) glass cladding. Examples of such applications include long period gratings for mode converters (See U.S. Pat. No. 5,104,209), wavelength-dependent loss elements in broadband amplifiers (See Vengsarkar et al, *Opt. Lett*. Vol. 21, p. 336, 1996), and as band-rejection filters (See Vengsarkar et al, *Journal of Lightwave Technology*, Vol. 14, p. 58, 1996). Low refractive index coatings are also needed for cladding-pumped optical fiber lasers, which utilize fiber gratings as cavity mirrors. Provision of a coating having a refractive index lower than that of silica is most easily attained using fluorinated or silicon-based components.

An increasing variety of hydrocarbon-based vinyl ether monomers are commercially available through companies such as ISP, BASF, and Allied-Signal. Some of the suitable commercial or developmental monomer candidates include triethyleneglycol divinylether (DVE-3), 1,4-cyclohexanedimethanol divinylether (CHVE), n-dodecylvinylether, octadecylvinylether, cyclohexyl vinylether (CVE), dipropyleneglycol divinylether (DPE-2), diethyleneglycol divinylether, 2-ethylhexyl vinylether, hexanediol divinylether (HDDVE), butanediol divinylether, ethyleneglycol butylvinylether, triethyleneglycol methylvinylether, and trimethylolpropane trivinylether. Of these, CHVE is a particularly preferred monomer based on its difunctional character, high $T_g$ and hardness, good UV transparency, high boiling point, relatively high viscosity, chemical compatibility with desirable oligomers, commercial availability and TSCA status. We have found, however, that the UV absorbency of CHVE near 240 nm can vary undesirably by a factor of nearly 4x depending upon the commercial source. Another preferred monomer is hexanediol divinylether (HDDVE), based upon its high $T_g$ and hardness, chemical compatibility with desirable oligomers, and superior UV transparency to CHVE. At present, however, HDDVE is not TSCA listed and may not become commercially available in the near future. Cyclohexyl vinyl ether (CVE) is an excellent monofunctional monomer that can provide high $T_g$ and hardness, and is preferred for use in combination with difunctional or multifunctional monomers to reduce crosslink density and thereby increase toughness.

To maximize cationic cure speed, the coating formulation should minimize the content of basic moieties such as OH and NH. This, in turn, allows the concentration of photo-initiator to be minimized, which is then advantageous for UV transparency. In general, vinyl ether monomers containing hydroxyl, urethane and amino functionalities are not suitable for this application. However, low levels of such monomers may be incorporated for the purposes of extending shelf life, since basic moieties can act as scavengers or getters for acidic species that are sometimes generated in the absence of light and can otherwise prematurely initiate polymerization.

Oligomer or Polymer Components

For optical fiber coatings, resin viscosities in the range 2000–15,000 cps and more preferably 5000–10,000 cps at 25° C. are desired. Vinyl ether monomers by themselves are relatively low in molecular weight, and will usually require the addition of thickeners such as oligomers or polymers in order to raise the viscosity to the desired range. Such oligomers/polymers preferably (though not necessarily) have functional groups that can react with the vinyl ether monomers to form a covalently crosslinked network. Oligomers having vinyl ether reactive groups are especially attractive, although covalent bonds may also be formed via other functionalities. For example, hydroxyl groups are known to react with vinyl ethers to form acetal linkages. Also, during cationic curing, acrylate groups may copolymerize with vinyl ethers via a free radical mechanism due to the production of free radical intermediate species; thus, acrylate functional oligomers (preferably with low levels of reactive groups) may also be used to form covalently crosslinked networks. Unreactive polymers or oligomers may also be used as thickeners, provided that they do not phase-separate from the cured vinyl ether network in a manner that disturbs the optical transparency of the coating. In general, for UV transparent coatings, any oligomer or polymer may be incorporated which gives the desired level of UV transparency and balance of other needed properties, e.g., viscosity, hardness, Tg, chemical compatibility with vinyl ethers, long-term reliability, strippability, etc.

Presently, only a few vinyl ether functional oligomers are commercially available. These include e.g., Vectomer® 2010, Vectomer® 2020, and Vectomer® 2032 from Allied-Signal and two developmental products, PEG200-DVE and PTHF290-DVE from BASF. These have not proven satisfactory for our purpose in providing a desired balance of UV transparency, viscosity and hardness.

We have prepared vinyl ether functionalized oligomers that are suitable for formulating UV transparent optical fiber coatings according to methods described in U.S. Pat. No. 5,989,627. Particularly well-suited are oligomers based on polytetrahydrofuran which have been chain-extended to have molecular weight greater than 2900 (preferably greater than 10,000) by using aliphatic or cycloaliphatic diepoxides. The polytetrahydrofuran backbone provides a desirable combination of properties including flexibility, low glass transition temperature, resistance to hydrolysis, and excellent UV transparency. Polytetrahydrofuran is superior to other polyethers such as polyethylene oxide and polypropylene oxide with respect to hydrophobicity, and has superior oil resistance as compared with saturated hydrocarbon backbones.

At present, a preferred thickener for formulating UV transparent coatings is polytetrahydrofuran (PTHF) diol or a chain-extended version thereof. PTHF diol is only available commercially in molecular weights up to ~2900. At that molecular weight, suitable coating viscosities have only been achieved using oligomer loadings greater than 50%, which provide relatively soft optical fiber coatings. In order to use PTHF diol to prepare hard, abrasion resistant coatings, we have found it useful to chain-extend a lower molecular weight diol using aliphatic or cycloaliphatic di- or multi-functional epoxides as in the aforementioned co-pending patent application. We have found, however, that the oligomer need not be vinyl ether end-capped. The relatively low levels of primary hydroxyl end groups and secondary hydroxyls that result from epoxy chain extension do not interfere unduly with cure, and are believed to provide a beneficial effect on shelf life stability. There is some evidence from infrared spectroscopy that a portion of the hydroxyl groups form covalent acetal linkages with the vinyl ether monomers. Examples of preferred diepoxides are neopentyl glycol diglycidyl ether (NPGDE) and the diglycidyl ether of hydrogenated Bisphenol A (HBPADGE).

Other non-vinyl ether functionalized polymers with at least some utility as thickeners for preparing UV transparent coatings include various non-aromatic poly(alkyl acrylates), cellulose derivatives, reactive urethane acrylate oligomers, and polyvinyl butyral. The best candidates are those with minimal concentration of ester and/or urethane groups. The compatibility with vinyl ether monomers is typically limited to polymers within a certain molecular weight range that depends upon both the polymer and the particular monomer. Specific examples include polymethylmethacrylate, polybutyl methacrylates, polycyclohexylmethacrylate, polytetrahydrofuran urethane acrylate oligomer (ALU-353, Echo Resins), an aliphatic polyester urethane acrylate oligomer (CN964, Sartomer), a polymerizable cellulosic oligomer (Jaylink 103M, Bomar Specialties), a polyvinylbutyral, and a methylsilsesquioxane (GR650, OI-NEG). Still other useful materials have included oligomers with saturated hydrocarbon backbones such as KRATON LIQUID™ HPVM 2211 poly(ethylene/butylene) diacrylate (Shell Chemical).

Photoinitiators

Any cationic photoinitiator (or mixture of photoinitiators) may be used, provided that it is soluble in and compatible with the vinyl ether coating formulation and provides the desired level of UV transparency and photo curing speed. In practice, we have found a number of alkyl-substituted or alkoxy-substituted diaryliodonium and triarylsulfonium salts to be suitable at levels below about 0.03 wt %, and in some cases less than 0.01 wt %. Some degree of alkyl or alkoxy substitution on the photoinitiator is beneficial for solubility in the vinyl ethers. Examples of suitable photoinitiators include (4-octyloxyphenyl)phenyl iodonium hexafluoroantimonate (developmental product designation GE479-2092C, later commercialized as UV9392C, GE Silicones), (4-dodecyloxyphenyl)phenyl iodonium hexafluoroantimonate, (4-dodecyloxyphenyl)diphenyl sulfonium hexafluoroantimonate, di(t-butylphenyl)iodonium triflate, and di(t-butylphenyl)iodonium nonaflate. Conceptually, alkyl or cycloalkyl (non-aromatic) cationic photoinitiators could be particularly beneficial for UV transparency, by inference from the use of non-aromatic ketone free radical photoinitiators in acrylate formulations (See U.S. Pat. No. 5,773,486.)

Additives

The coating composition of the invention may contain one or more additives, e.g. co-initiators, stabilizers, adhesion promoting agents. Preferably these additives have chemical structures that comprise only atoms having covalent bonds selected from the group C—C, C—H, C—O, C—Si, O—H, Si—O, and C—F.

EXAMPLES

Example 1

Figure 1:
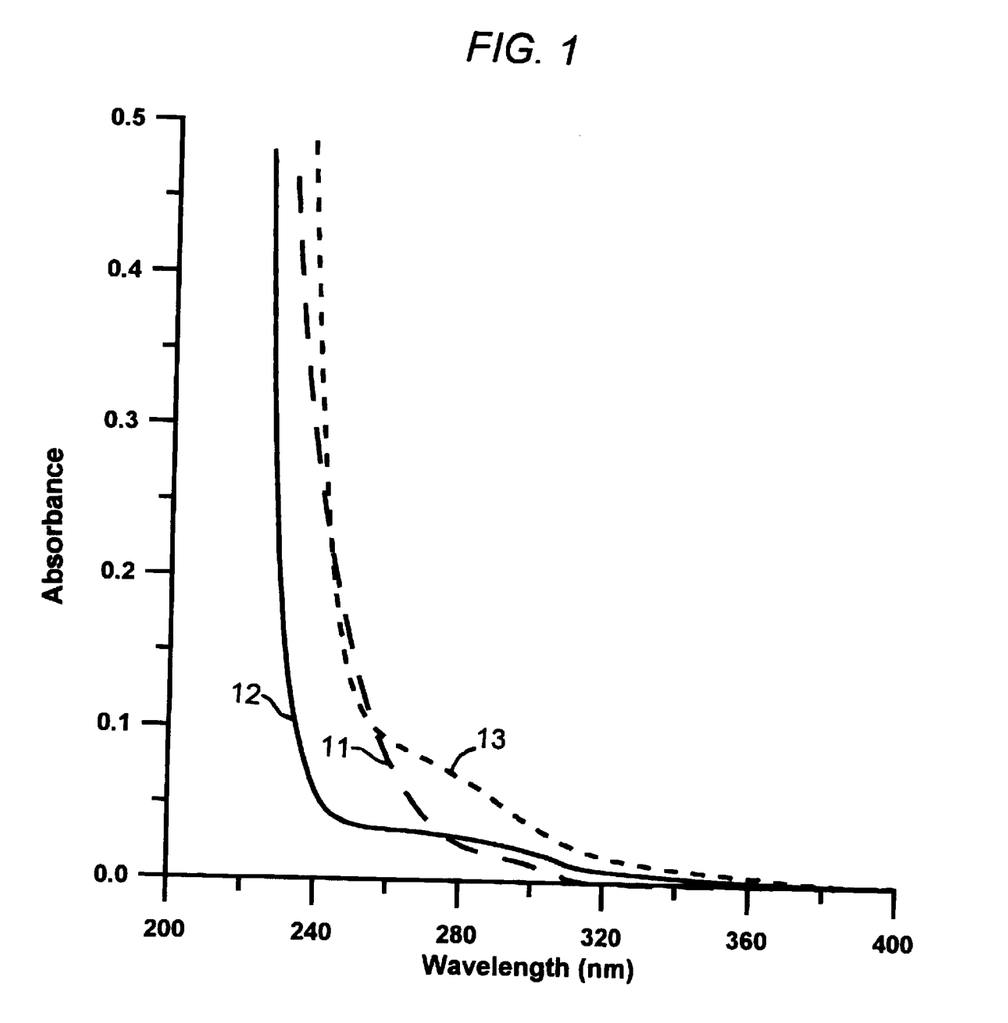
FIG. 1 is a plot of absorbance vs. wavelength showing UV spectra for coating materials of the invention (11 and 12), and for an acrylate coating material of the prior art (13)

A polytetrahydrofuran urethane acrylate oligomer, ALU-353 (Echo Resins), was blended with 1,4-cyclohexanedimethanol divinyl ether (CHVE) at concentrations of 49, 56 and 60 wt % oligomer to give clear solutions having viscosities of 6400, 12,600 and 19,000 cps at room temperature, respectively. The formulation having 56 wt % oligomer, designated Coating A, also incorporated 0.073 phr of a cationic photoinitiator, di(t-butyl phenyl)iodonium triflate, that had been synthesized in our laboratory. This formulation was UV cured to give a soft, rubbery material. FIG. 1 shows the UV spectra of 22 μm films of Coating A between quartz plates, both uncured, curve 11, and after a UV dose of about 2 J/cm² under a Fusion H bulb, curve 12. Also shown for reference is the spectrum of Coating B, curve 13, a relatively low UV absorbing acrylate formulation prepared according to U.S. Pat. No. 5,773,486. [The latter comprised 60 parts of an aliphatic polyester urethane acrylate oligomer, CN964 (Sartomer), and 40 parts of propoxylated neopentyl glycol diacrylate (SR9003B, Sartomer, filtered to remove MEHQ stabilizer), together with 2.5 phr pinacolone photoinitiator.] The vinyl ether formulation exhibits superior UV transparency to the acrylate formulation after cure, having an absorbance less than 0.05 in the range 240–260 nm. The observed decrease in the UV absorbance of Coating A upon UV exposure indicates conversion of the acrylate groups, which in turn suggests that free radicals were generated as intermediates upon photoactivation of the cationic photoinitiator. Thus, the addition of a separate free radical photoinitiator was not needed.

Example 2

The aliphatic polyester urethane acrylate oligomer that was used in Coating B above, CN964 (Sartomer), was blended with CHVE at concentrations of 65 and 70 wt % oligomer to give clear solutions having viscosities of 2800 and 5800 cps at room temperature, respectively. The formulation having 70 wt % oligomer also incorporated 0.06 phr of the cationic photoinitiator, di(t-butyl phenyl)iodonium triflate, and could be UV cured to a tough film. This formulation, Coating C, was coated and UV cured onto a glass optical fiber using a high photosensitivity preform (as in U.S. Pat. No. 5,745,615) in a pilot scale conventional draw tower operating at a draw speed of ~0.5 m/s using a single UV lamp. The coating outer diameter (OD) was ~222 μm and the nominal glass OD was 125 μm, providing a coating thickness of about 49 μm. The fiber was sensitized with deuterium under pressure at elevated temperature using a standard process. Despite some unevenness and imperfections of the coating, a 0.5 dB reflector Bragg grating was successfully written into the fiber through the coating using a mask and a continuous wave (CW) laser operating at 257 nm. The grating was written by scanning the focussed beam over a 35 mm length during a period of 3 minutes. This represents the first instance of a fiber grating being written through a vinyl ether-based coating.

Example 3

For formulation D, an oligomer was first prepared by chain extending BASF PTHF2900 polytetrahydrofuran diol using neopentyl glycol diglycidyl ether (NPGDE) as a linking agent. 14.5 g (0.005 mole) of PTHF2900 were placed in a 30 ml beaker and heated to melt (~100° C.). With stirring, 2 drops of boron trifluoride diethyl etherate were added. Next, 1.0 ml (0.005 mole) of NPGDE was gradually added with vigorous stirring for about 1 minute. The reaction mixture was cooled, then dissolved in ethyleneglycol dimethyl ether (EGDME) and precipitated in ice water. White polymer was collected and air-dried, then dried in a vacuum oven at room temperature for 2 hours. The number average molecular weight of the PTHF2900 was measured to be 2837 using gel permeation chromatography (GPC) and PTHF standards. The number average molecular weight ($M_n$) of the chain-extended oligomer was measured to be 6610; peak average molecular weight ($M_p$) was 11,671; weight-average molecular weight ($M_w$) was 41,166.

The oligomer, which was designated PTHF-NPGDE, was mixed with CHVE in a 50/50 wt/wt ratio, together with 0.025 wt % of GE479-2092C iodonium salt photoinitiator. The resin viscosity was 6600 cps. This Coating D was applied to optical fiber and UV cured using the same high photosensitivity glass preform and draw tower as in Example 2, with draw speeds of 0.2–0.5 m/s. A smooth, uniform, essentially colorless coating was obtained on the fiber. The coating had good hardness, suitable for use as a single coating. This was corroborated by measuring the $T_g$ on the coated fiber to be ~60–80° C. using a TA Instruments TMA2940 thermomechanical analyzer with a penetration probe.

The fiber was sensitized with deuterium under pressure in a manner similar to Example 2, except that the process was conducted at room temperature for a longer time. A 6 dB (~70% reflectivity) grating was written into this fiber through the coating using a mask and a CW laser operating at 257 nm. The laser beam was scanned through a mask over a 3.5 cm length during a period of 13 minutes.

Example 4

Another chain-extended PTHF-NPGDE oligomer was prepared in a similar fashion as in Example 3, but on a larger scale. 145 g (0.05 mole) of PTHF 2900 was heated at ~80° C., and 0.5 ml of $BF_3$-diethyl etherate was added with stirring. 15 g (0.07 mole) of NPGDE was added at a rate of 10 ml/h. At the end of the addition, a viscous mass was formed. The mixture was allowed to cool and was then dissolved in 300 ml of EGDME. The solution was precipitated into ice water and 128 g was obtained. This was dissolved in 300 ml tetrahydrofuran (THF) and reprecipitated into cold methanol (0–10° C.) cooled with dry ice. A white powder was obtained, which was then dried in a vacuum oven at room temperature overnight to obtain 103 g of product. The GPC molecular weights of this oligomer were: $M_n$=12,916; $M_p$=12,148; $M_w$=42,491.

Figure 2:
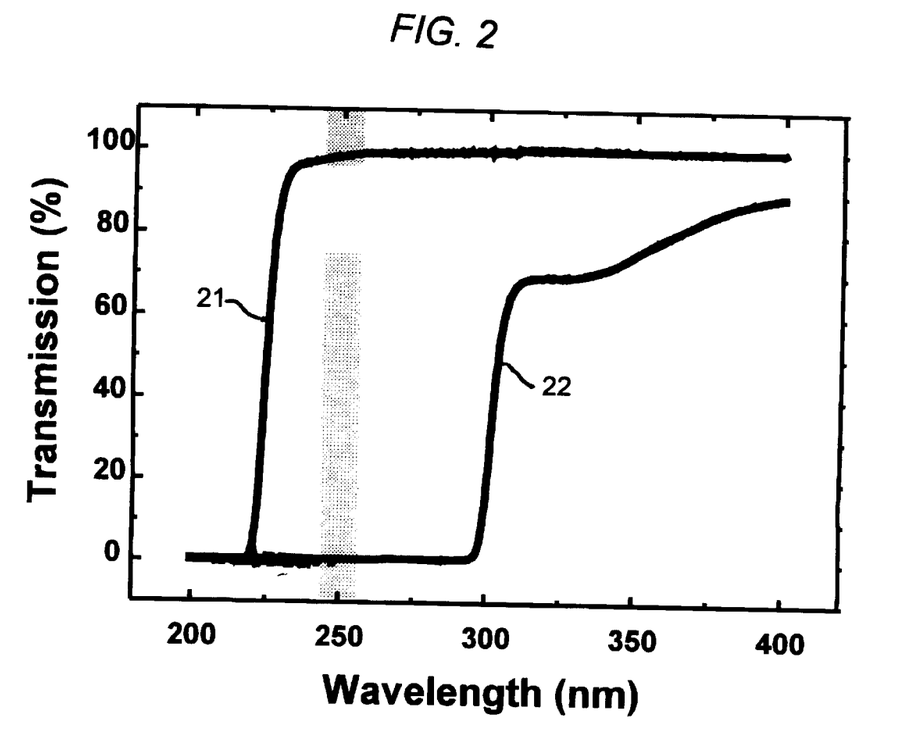
FIG. 2 is a plot of transmission in % vs. wavelength comparing a material of the invention (21) with a conventional acrylate coating material (22)
Figure 3:
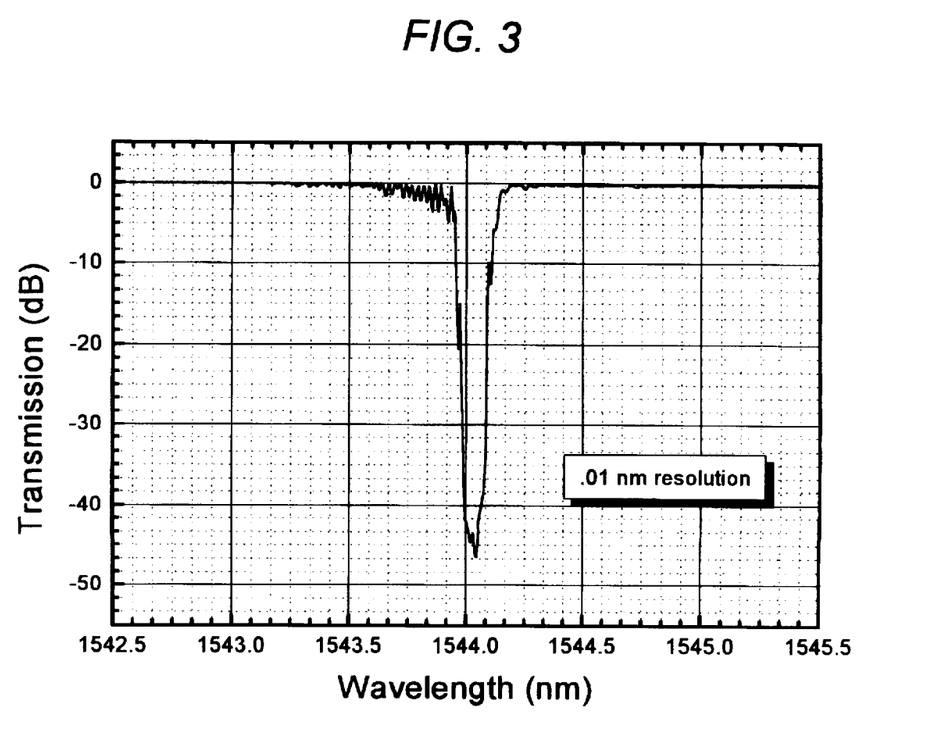
FIG. 3 is a plot of transmission in dB vs. wavelength of a Bragg grating made using the technique and the coating material of the invention.

Coating E was formulated using 40 wt % of this FTHF-NPGDE oligomer, 50 wt % CHVE, and 10 wt % CVE, plus 0.025 phr GE479-2092C cationic photoinitiator. The transmission UV spectrum of this coating is shown by curve 21 in FIG. 2 in comparison with that of a conventional urethane acrylate optical fiber coating (each 22 μm thick), curve 22, demonstrating superior UV transparency of the vinyl ether coating. Coating E was filtered through a 1.2 μm filter, then coated onto a high photosensitivity glass fiber at 0.1–0.47 m/s. The coating thickness was ~55 μm. The fiber was loaded with 2.5% deuterium using a standard process. A highly reflective grating (>99.99% reflectivity, −45 dB transmission) was written through the coating into this fiber using a phase mask and a CW laser operating at a wavelength of 257 nm (FIG. 3). The laser was operated with an output beam of 45 mW focussed to a ~3 mm line and scanned over a length of 3 cm length for a period of 20 minutes.

A second Bragg grating was written under similar conditions except that the scan time was reduced to 500 seconds and the power increased to 50 mW. In this case the grating measured −36 dB in transmission. Mechanical strength measurements indicated that the fiber was comparable in strength to standard telecommunication fiber and that the grating writing process caused no strength degradation.

Example 5

Other chain-extended diols of PTHF 2900 were synthesized similarly as in Examples 3–4, except that the linking agent was the diglycidyl ether of hydrogenated Bisphenol A (HBPADGE; Epalloy 5000, CVS Specialty Chemicals) and the reactions were conducted in toluene. The diol and diepoxide were added in equimolar ratios, and the ratio of diol:toluene was varied from 1:1 to 1:2. The toluene was removed by rotary evaporation at 60° C., utilizing an azeotrope with methanol. The products were dissolved in ethanol, chilled to precipitate, filtered and dried under vacuum.

Figure 4:
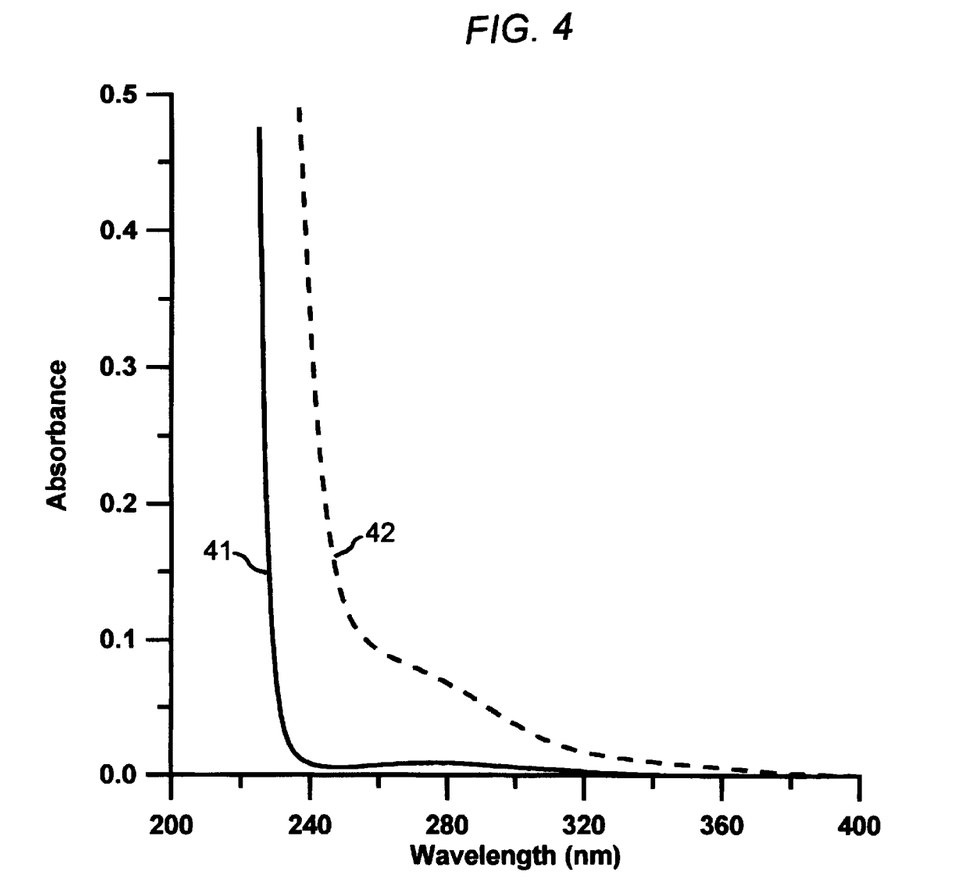
FIG. 4 is a plot of absorbance vs. wavelength for a coating material of the invention (41) and comparing it to an acrylate coating material of the prior art (42)

Two such PTHF-HBPADGE oligomers were blended together and mixed with HDDVE monomer (46.3 wt % oligomer), incorporating also 0.025 phr GE479-2092C photoinitiator. This Coating F had a viscosity of ~5000 cps and could be UV-cured to a semi-hard film. The UV spectrum for a 22 μm film of this resin is shown by curve 41 in FIG. 4 after an exposure of ~3 J/cm$^2$ under a Hg UV lamp. The spectrum of Coating F was superior to that of acrylate coating B, curve 42, as well as that of the vinyl ether/urethane acrylate formulation A shown in FIG. 1. This formulation displayed excellent shelf life, with no evidence of gelation while stored in a glass jar for more than 7 months.

Example 6

Coating G was formulated using 30 wt % polymethylmethacrylate (Aldrich 44,573-8; MW ~75,000) as a thickener, together with CHVE (35 wt %) and DPE-2 (35 wt %) vinyl ether monomers. Viscosity was ~12,700 cps. Di(t-butylphenyl)iodonium triflate photoinitiator was incorporated at only 0.0076 phr to provide a coating that processed well on optical fiber and UV cured to a hard, essentially colorless coating with high adhesion. A high photosensitivity preform was again used, with a draw speed of ~0.35 m/s. The coating OD was ~235 μm, resulting in a nominal coating thickness of 55 μm. The coated fiber was loaded with deuterium under pressure at room temperature. A 1 dB grating was written through the coating into the fiber using a CW laser with a 5 mm static beam at a wavelength of 244 nm and an exposure time of 1 minute. The UV absorbance of a 22 μm film of Coating G, both before and after UV curing, was ~0.04.

Example 7

While polymethylmethacrylate showed adequate utility in Example 6, an aliphatic or cycloaliphatic alkyl acrylate with a lower concentration of ester groups would be expected to provide superior UV transparency. Coating H was formulated using polycyclohexylmethacrylate (PCHMA, Aldrich 19,194-9; GPC MW ~65,000) and CHVE in a 32/68 wt ratio, with only 0.008 phr di(t-butylphenyl) iodonium triflate photoinitiator. This resin had a viscosity of 6000 cps and was successfully coated and UV cured onto a glass optical fiber on a pilot scale draw tower at 0.43 m/s to provide a smooth, hard, essentially colorless coating. The UV spectrum for a similar formulation, but which had 30% PCHMA and more photoinitiator (0.047 phr), exhibited an absorbance of only 0.03 at a wavelength of 257 nm as measured for a 22 μm film between quartz plates.

Example 8

Coating I was formulated using 30 wt % polymethylmethacrylate (Aldrich 44,573-8; MW ~75,000) as a thickener, together with DVE-3 (70 wt %) ether monomer. The mixture formed a clear, miscible solution having a viscosity of 4920 cps.

Example 9

A poly(methyl silsesquioxane) (Glass Resin® 650, OI-NEG) was dissolved in DVE-3 at 50 wt % of the polymer, forming a clear miscible solution having a viscosity of about 2000 cps. This mixture could be cured to give a hard film. The UV spectrum of a 22 μm film cured with 0.06 phr of di(t-butyl phenyl)iodonium triflate gave an absorbance of ~0.04 at 257 nm.

Example 10

A poly(n-butyl methacrylate) resin (Elvacite 2044, ICI) was dissolved at 35 wt % in CHVE, forming a clear, miscible solution having a viscosity of 6200 cps. The molecular weight of the polymer thickener was nominally 142,000. The absorbance of this solution in a 22 μm film was 0.166 at a wavelength of 257 nm.

Example 11

A polyvinyl butyral (Scientific Polymer Products, Cat. # 043A) having a molecular weight of ~36,000 was found to be compatible with CHVE at a loading of 20 wt % of the polymer.

As described above, a preferred use of the monomers, oligomers and polymers described above is as precursor materials for optical fiber coatings. Manufacturing techniques for commercial fibers involve drawing the glass fiber from a glass preform and coating the fiber with a liquid polymer immediately after drawing. This sequence is essential due to the fragility of uncoated fibers. The liquid polymer must be cured or otherwise solidified very rapidly to allow the fiber to be drawn and reeled at a workable and commercially attractive draw speed. The cure mechanism predominantly used in commercial practice is UV induced polymerization. This mechanism involves use of a coating composition that polymerizes by free radical or cationic initiators. Free radical photoinitiators are described in U.S. Pat. No. 5,773,486. Cationic initiators are described in J. V. Crivello, *Advances in Polymer Sci.*, 64, pp. 1–48 (1984). To facilitate rapid curing UV sensitive polymer coating compositions have been carefully engineered to optimize the effectiveness of the photoinitiation process.

In the preferred embodiment of the invention the oligomer or polymer coating compositions described above are used for coating optical fibers which are then used for the manufacture of optical gratings formed in the core of the optical fibers. These optical gratings are typically produced by photoinducing refractive index changes in the core of an appropriately sensitized glass fiber. The desired grating pattern is formed by using actinic radiation ( typically an excimer laser—pumped frequency doubled dye laser operating near 240 nm ) with a varying intensity or periodicity along the length of the fiber. This is conveniently done using a photomask, or by using a patterned light beam produced, e.g., by an interference pattern. The refractive index changes are produced typically by UV induced changes at defect sites of an absorbing ion such as germanium. The germanium doped fiber may be sensitized by hydrogen or deuterium treatments known in the art. Very large (>0.01) refractive index changes can be obtained in such a process. These techniques for forming optical gratings are well known in the art and are described in e.g. U.S. Pat. Nos. 4,725,110, issued Feb. 16, 1988 and 5,327,515, issued Jul. 5, 1994, both of which are incorporated herein by reference.

While the photochemical process for forming these optical gratings is very effective, it usually requires the removal of the polymer coating from the fiber so as to allow the actinic light (UV) to reach the core with sufficient intensity to effect the desired transition. The coating may be stripped from the grating region by various means, e.g. by dissolving the polymer in sulfuric acid. After the grating is formed the portion of the fiber from which the coating was stripped must be recoated or otherwise mechanically protected from abrasion. The processing required to remove and later replace the fiber coating has proved to add more than 50% to the cost of manufacturing the grating. Moreover, stripping and recoating the fiber reduces yield due to mechanical strength test failures. It is important to find effective manufacturing techniques that avoid the cumbersome and costly operations just described.

Attempts have been made to form the grating by exposing bare glass fiber to UV patterns during the draw operation but these have met with limited success.

An approach to simplifying fiber grating forming that shows considerable promise is described and claimed in U.S. Pat. No. 5,620,495. The process described in that application involves exposing the fiber to the actinic radiation through the polymer fiber coating. That expedient eliminates the cumbersome steps of removing the fiber coating in the vicinity of the grating and reapplying coating material after the grating is formed. Following this teaching, the polymer coating must be substantially transparent to the UV radiation used to form the grating. Typically this radiation is in the band 235 to 260 nm. The vinyl ether terminated materials described in the examples above all have absorbance values of less than $0.016/\mu m$, and preferably less than $0.005/\mu m$, in this wavelength band, which is an appropriate standard for meeting this requirement. They also have absorbance values of less than $0.016/\mu m$, and preferably less than $0.005/\mu m$, over the full wavelength band of 240–400 nm.

Figure 5:
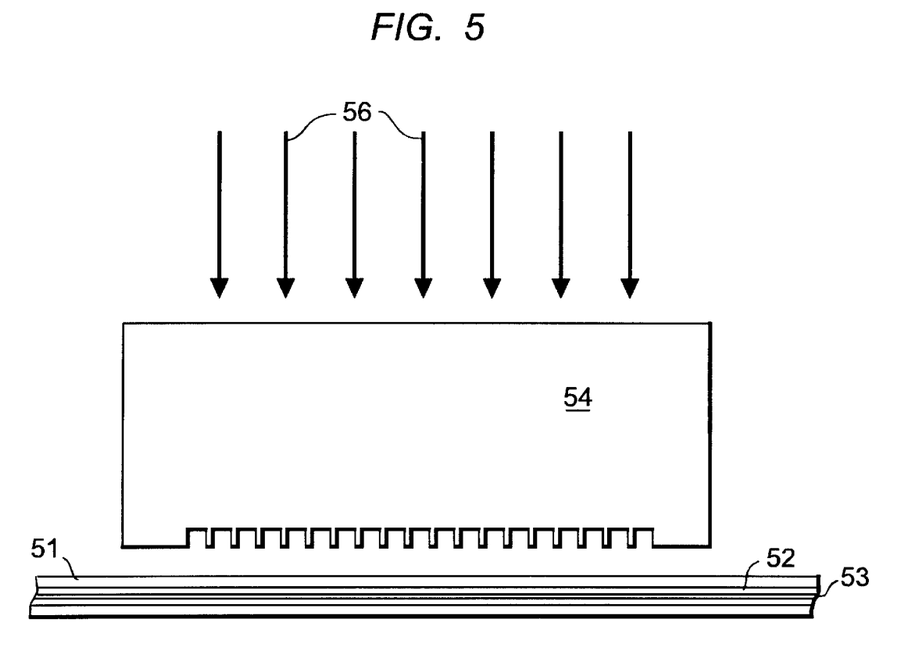
FIG. 5 is a schematic diagram illustrating the technique of writing a grating into the core of an optical fiber by projecting radiation through the coating on the optical fiber.

Referring to the FIG. 5, an optical fiber is shown with polymer coating 51, cladding 52, and core 53. The coating may comprise more than one layer, but a single layer is often preferred. A UV laser source represented by arrows 56 is shown incident on an $SiO_2$ phase mask 54. UV radiation is diffracted into a light pattern of fine lines by the phase mask and is incident on the fiber core 53 after passing through the polymer coating 51 and the cladding layer 52. More details on this process can be found in U.S. Pat. No. 5,620,495.

The preferred UV source for forming the grating is an excimer laser-pumped frequency doubled dye laser operating at a wavelength around 240 nm, although other sources may be employed. In general, to be effective in forming the desired refractive index changes, the radiation should be in the band 235–260 nm. By contrast the typical UV radiation used to cure polymer coatings in commercial fiber drawing operations is at or near 360 nm. Most commercial polymer coating materials are formulated to maximize UV absorption by the curing radiation (250–400 nm). These materials absorb strongly throughout much of the UV band and have enough absorption in the 235–260 nm range that gratings cannot be written through them without substantial damage to the coating itself. The optical fiber coating material according to the invention is essentially transparent, when used with appropriate initiators, to radiation used to write gratings.

It will be apparent to those skilled in the art that the invention described herein is most useful with optical fibers that are manufactured by drawing a glass fiber from a glass preform, coating the fiber with a UV curable resin, and curing the coated fiber by exposure to UV radiation. The coating may be a single coating or a multiple coating. In the latter case the material of the invention may be either the primary coating or a secondary coating, or both.

Reference herein and in the appended claims to multifunctional monomers is intended to include di-functional monomers.

Various additional modifications of this invention will occur to those skilled in the art. All deviations from the specific teachings of this specification that basically rely on the principles and their equivalents through which the art has been advanced are properly considered within the scope of the invention as described and claimed.

We claim:

1. A ultraviolet (UV) transparent coating composition that is UV curable comprising:
   a. 10–70 wt % of the coating composition of at least one vinyl ether functional monomer,
   b. 30–50 wt % of the coating composition of an oligomer of polytetrahydrofuran diol that has been chain-extended with a difunctional aliphatic or cycloaliphatic epoxide to have a number average molecular weight greater than about 6000, and
   c. an effective level of a cationic photoinitiator,
   said coating composition having a viscosity in the range 700–20,000 cps at 25° C., and a cured optical absorbance at wavelengths of 240–400 nm of less than $0.016/\mu m$.

2. The coating composition of claim 1 further including 1–50 wt % of the coating composition of a monofunctional aliphatic or cycloaliphatic vinyl ether monomer for which the homopolymer has a glass transition temperature that is greater than 25° C.

3. The coating composition of claim 2 in which the vinyl ether is cyclohexylvinyl ether.

4. The coating composition of claim 2 further including <0.1 wt % of coating composition of an alkyl-substituted diaryliodonium or alkyl-substituted triarylsulfonium salt cationic photoinitiator.

5. A UV transparent coating composition that is UV curable comprising:
   a. 10–90 wt % of the coating composition of at least one vinyl ether functional monomer,
   b. 10–90 wt % of the coating composition of an oligomeric or polymeric thickener, and
   c. an effective level of a cationic photoinitiator that is devoid of aromatic moieties, said coating composition having a viscosity in the range 700–20,000 cps at 25° C., and a cured optical absorbance at wavelengths of 240–400 nm of less than 0.016/μm.

6. A UV transparent coating composition that is UV curable comprising:
   a. 10–90 wt % of the coating composition of at least one vinyl ether functional monomer,
   b. 10–90 wt % of the coating composition of a vinyl ether functional oligomer or polymer thickener that is devoid of nitrogen, aryl and carbonyl moieties, and
   c. an effective level of a cationic photoinitiator,
said coating composition having a viscosity in the range 700–20,000 cps at 25° C., and a cured optical absorbance at wavelengths of 240–400 nm of less than 0.016/μm.

7. The coating composition of claim 6 wherein the thickener is a vinyl ether functionalized oligomer based on polytetrahydrofuran.

8. The coating composition of claim 6 wherein the oligomer has $M_n$>2900.

9. The coating composition of claim 8 wherein the oligomer has $M_n$>10,000.

10. The coating composition of claim 9 wherein the oligomer is based on polytetrahydrofuran diol that has been chain-extended using an aliphatic or cycloaliphatic diepoxide.

11. A UV transparent coating composition that is UV curable comprising:
   a. 10–90 wt % of the coating composition of at least one vinyl ether functional monomer,
   b. 10–90 wt % of the coating composition of an oligomeric or polymeric thickener selected from the group consisting of polymethylmethacrylate; poly(n-butyl methacrylate); polycyclohexylmethacrylate; polytetrahydrofuran diol; aliphatic and/or cycloaliphatic polyether (mono-, di-, or multifunctional) acrylate; aliphatic and/or cycloaliphatic polyester (mono-, di-, or multifunctional) acrylate; poly(methylsilsesquioxane); ethylenically-substituted poly(methylsilsesquioxane); cellulose derivatives; polyvinyl butyral, and
   c. an effective level of a cationic photoinitiator, said coating composition having a viscosity in the range 700–20,000 cps at 25° C., and a cured optical absorbance at wavelengths of 240–400 nm of less than 0.016/μm.

12. A UV transparent coating composition that is UV curable comprising:
   a. 10–90 wt % of the coating composition of at least one vinyl ether functional monomer that contains silicon atoms,
   b. 10–90 wt % of the coating composition of an oligomeric or polymeric thickener, and
   c. an effective level of a cationic photoinitiator,
said coating composition having a viscosity in the range 700–20,000 cps at 25° C., and a cured optical absorbance at wavelengths of 240–400 nm of less than 0.016/μm.

13. A UV transparent coating composition that is UV curable comprising:
   a. 10–90 wt % of the coating composition of at least one vinyl ether functional monomer,
   b. 10–90 wt % of the coating composition of an oligomeric or polymeric thickener that contains silicon atoms, and
   c. an effective level of a cationic photoinitiator,
said coating composition having a viscosity in the range 700–20,000 cps at 25° C., and a cured optical absorbance at wavelengths of 240–400 nm of less than 0.016/μm.

14. A method for the manufacture of optical fiber gratings comprising the step of exposing the core of an optical fiber to a pattern of UV radiation, said optical fiber comprising a core, a cladding and a coating wherein said UV radiation is directed through said cladding and said coating, and said coating obtained by photocuring a composition comprising:
   a. 50–70 wt % of the composition of at least one vinyl ether functional monomer,
   b. 30–50 wt % of an oligomer of polytetrahydrofuran diol that has been chain-extended with a difunctional aliphatic or cycloaliphatic epoxide to have a number average molecular weight greater than about 6000, and
   c. an effective level of a cationic photoinitiator, said coating composition having a viscosity in the range 700–20,000 cps at 25° C., and a cured optical absorbance at wavelengths of 240–400 nm of 0.016/μm.

15. The method of claim 14 further including 1–50 wt % of the composition of a monofunctional aliphatic or cycloaliphatic vinyl ether monomer in which the homopolymer has a glass transition temperature that is greater than 25° C.

16. The method of claim 15 in which the monofunctional vinyl ether is cyclohexylvinyl ether.

17. The method of claim 15 further including <0.1 wt % of an alkyl-substituted diaryliodonium or alkyl-substituted triarylsulfonium salt cationic photoinitiator.

18. A method for the manufacture of optical fiber gratings comprising the step of exposing the core of an optical fiber to a pattern of UV radiation, said optical fiber comprising a core, a cladding and a coating, wherein said UV radiation is directed through said cladding and said coating, and said coating obtained by photocuring a composition comprising:
   a. 10–90 wt % of the composition of at least one vinyl ether functional monomer,
   b. 10–90 wt % of the composition of an oligomeric or polymeric thickener, and
   c. an effective level of a cationic photoinitiator devoid of aromatic moieties,
said coating composition having a viscosity in the range 700–20,000 cps at 25° C., and a cured optical absorbance at wavelengths of 240–400 nm of 0.016/μm.

19. A method for the manufacture of optical fiber gratings comprising the step of exposing the core of an optical fiber to a pattern of UV radiation, said optical fiber comprising a core, a cladding and a coating, wherein said UV radiation is directed through said cladding and said coating, and said coating obtained by photocuring a composition comprising:
   a. 10–90 wt % of the composition of at least one vinyl ether functional oligomer or polymer that is devoid of nitrogen, aryl and carbonyl moieties,
   b. 10–90 wt % of the composition of an oligomeric or polymeric thickener, and
   c. an effective level of a cationic photoinitiator,
said coating composition having a viscosity in the range 700–20,000 cps at 25° C., and a cured optical absorbance at wavelengths of 240–400 nm of 0.016/μm.

20. The method of claim 19 wherein the thickener is a vinyl ether functionalized oligomer based on polytetrahydrofuran.

21. The method of claim 20 wherein the oligomer has $M_n$>2900.

22. The method of claim 21 wherein the oligomer has $M_n$>10,000.

23. The method of claim 22 wherein the oligomer is based on polytetrahydrofuran diol that has been chain-extended using an aliphatic or cycloaliphatic diepoxide.

24. A method for the manufacture of optical fiber gratings comprising the steps of exposing the the core of an optical fiber to a pattern of UV radiation, said optical fiber comprising a core, a cladding and a coating, wherein said UV radiation is directed through said cladding and said coating, and said coating obtained by photocuring a composition comprising:
   a. 10–90 wt % of the coating composition of at least one vinyl ether functional monomer,
   b. 10–90 wt % of the coating composition of an oligomeric or polymeric thickener selected from the group consisting of polymethylmethacrylate; poly(n-butyl methacrylate); polycyclohexylmethacrylate; polytetrahydrofuran diol; aliphatic and/or cycloaliphatic polyether (mono-, di-, or multifunctional) acrylate; aliphatic and/or cycloaliphatic polyester (mono-, di-, or multifunctional) acrylate; poly(methylsilsesquioxane); ethylenically-substituted poly(methylsilsesquioxane); cellulose derivatives; polyvinyl butyral, and
   c. an effective level of a cationic photoinitiator,
said coating composition having a viscosity is in the range 700–20,000 cps at 25° C., and a cured optical absorbance at wavelengths of 240–400 nm of less than 0.016/$\mu$m.

25. A method for the manufacture of optical fiber gratings comprising the step of exposing the core of an optical fiber to a pattern of UV radiation, said optical fiber comprising a core, a cladding and a coating, wherein UV radiation is directed through said cladding and said coating, and said coating obtained by photocuring a composition comprising:
   a. 10–90 wt % of the composition of at least one vinyl ether functional monomer that contains silicon atoms,
   b. 10–90 wt % of the composition of an oligomeric or polymeric thickener, and
   c. an effective level of a cationic photoinitiator,
said coating composition having a viscosity in the range 700–20,000 cps at 25° C., and a cured optical absorbance at wavelengths of 240–400 nm of 0.016/$\mu$m.

26. A method for the manufacture of optical fiber gratings comprising the step of exposing the core of an optical fiber to a pattern of UV radiation, said optical fiber comprising a core, a cladding and a coating, wherein said UV radiation is directed through said cladding and said coating, and said coating obtained by photocuring a composition comprising:
   a. 10–90 wt % of the composition of at least one vinyl ether functional monomer,
   b. 10–90 wt % of the composition of an oligomeric or polymeric thickener that contains silicon atoms, and
   c. an effective level of a cationic photoinitiator,
said coating composition having a viscosity in the range 700–20,000 cps at 25° C., and a cured optical absorbance at wavelengths of 240–400 nm of 0.016/$\mu$m.

27. A method for the manufacture of optical fiber gratings comprising the step of exposing the core of an optical fiber to a pattern of UV radiation, said optical fiber comprising a core, a cladding and a coating, wherein said UV radiation is directed through said cladding and said coating, and said coating obtained by photocuring a composition comprising:
   a. 10–90 wt % of at least one vinyl ether functional monomer,
   b. 10–90 wt % of an oligomeric or polymeric thickener, and
   c. an effective level of a cationic photoinitiator,
said coating composition having a viscosity is in the range 700–20,000 cps at 25° C., a cured optical absorbance at wavelengths of 240–400 nm of 0.016/$\mu$m, and refractive index less than that of silica.

28. A method for the manufacture of optical fiber gratings comprising the step of exposing the core of an optical fiber to a pattern of UV radiation, said optical fiber comprising a core, a cladding and a coating, wherein said UV radiation is directed through said cladding and said coating, and said coating obtained by photocuring a composition comprising:
   a. 10–90 wt % of at least one vinyl ether functional monomer,
   b. 10–90 wt % of an oligomeric or polymeric thickener, and
   c. an effective level of a cationic photoinitiator,
said coating composition having a viscosity is in the range 700–20,000 cps at 25° C., a cured optical absorbance at wavelengths of 240–400 nm of 0.016/$\mu$m, and refractive index essentially matched to that of silica.

29. A method for the manufacture of optical fiber gratings comprising the step of exposing the core of an optical fiber to a pattern of UV radiation, said optical fiber comprising a core, a cladding and a coating, wherein said UV radiation is directed through said cladding and said coating, and said coating obtained by photocuring a composition comprising:
   a. 10–90 wt % of at least one vinyl ether functional monomer contain fluorine,
   b. 10–90 wt % of an oligomeric or polymeric thickener containing fluorine, and
   c. an effective level of a cationic photoinitiator containing fluorine,
said coating composition having a viscosity is in the range 700–20,000 cps at 25° C., a cured optical absorbance at wavelengths of 240–400 nm of 0.016/$\mu$m, and refractive index less than that of silica.

* * * * *